(12) United States Patent
Rivera (10) Patent No.: US 8,161,872 B2
(45) Date of Patent: Apr. 24, 2012

(54) AUTOMATED JUICE EXTRACTOR

(76) Inventor: Adrian Rivera, Whittier, CA (US)

( * ) Notice: Subject to any disclaimer, the term of this patent is extended or adjusted under 35 U.S.C. 154(b) by 895 days.

(21) Appl. No.: 12/206,964

(22) Filed: Sep. 9, 2008

(65) Prior Publication Data

US 2010/0058938 A1 Mar. 11, 2010

(51) Int. Cl.
*A23B 5/00* (2006.01)
*A23N 1/00* (2006.01)

(52) U.S. Cl. ............... 99/495; 99/501; 99/502; 99/503; 99/506; 99/509; 100/130; 100/131

(58) Field of Classification Search .......... 99/495, 99/506, 382 P, 289 R, 382 R, 501, 502, 510, 99/511; 100/130, 131; 74/10.45, 63, 89, 74/89.23, 89.37
See application file for complete search history.

(56) References Cited

U.S. PATENT DOCUMENTS

| | | | | |
|---|---|---|---|---|
| 2,642,908 A * | 6/1953 | Landgraf | ......... | 99/579 |
| 3,866,528 A * | 2/1975 | Montagroni | ......... | 99/495 |
| 4,531,457 A * | 7/1985 | Sivaslian | ......... | 99/507 |
| 5,193,447 A | 3/1993 | Lucas et al. | | |
| 6,041,697 A * | 3/2000 | Maoz | ......... | 99/572 |
| 6,070,519 A * | 6/2000 | Sham et al. | ......... | 99/348 |
| 6,186,057 B1 * | 2/2001 | Cremades Del Toro | ......... | 99/503 |
| 6,911,819 B1 * | 6/2005 | Tabrizi | ......... | 324/207.18 |
| 7,044,051 B2 * | 5/2006 | Le Rouzic | ......... | 99/512 |
| 2004/0103797 A1 * | 6/2004 | Repac et al. | ......... | 99/495 |
| 2005/0126404 A1 | 6/2005 | Basora | | |
| 2006/0169152 A1 * | 8/2006 | Lin et al. | ......... | 99/495 |
| 2006/0213375 A1 | 9/2006 | Moline | | |
| 2007/0012544 A1 | 1/2007 | Krossmann et al. | | |
| 2009/0038484 A1 * | 2/2009 | Trueba et al. | ......... | 99/502 |
| 2010/0116152 A1 * | 5/2010 | Fouquet | ......... | 99/501 |

FOREIGN PATENT DOCUMENTS

WO PCT/IB2006/000033 * 5/2006

* cited by examiner

*Primary Examiner* — Gene Kim
*Assistant Examiner* — John E Simms, Jr.
(74) *Attorney, Agent, or Firm* — Kenneth L. Green

(57) ABSTRACT

An automatic juicer turns and pushes an upward facing juicing cone into a fruit for releasing and collecting juice. The juicer includes a base containing a clutch and gearing assembly connected to a motor. A center column assembly rotates and advances the juicing cone. The juicing cone, strainer, and a bowl release and catch the juice. The center column includes an outer column fixed to the base, a rotating drive shaft driven by the motor but not advancing vertically, and a driven shaft which rotates with the drive shaft and advances and retreats vertically. The bowl is fixed to the base. The strainer advances vertically with juicing cone but does not rotate. The juicing cone is attached to the driven shaft and rotates and advances vertically, thereby releasing juice from the fruit. Knife edges on the bottom of the juicing cone scrape pulp from the strainer to prevent clogging.

16 Claims, 8 Drawing Sheets

AUTOMATED JUICE EXTRACTOR

BACKGROUND OF THE INVENTION

The present invention relates to juice extractors and in particular the electric juice extractors.

Juice extractors are commonly used to extract juice from, for example, oranges. Known manual juice extracts comprise a bowl with a raised conical ridged center, called a juicing cone. A user cuts a fruit in half, and pushes and rotates the exposed cut side down over the juicing cone. The juice is thereby released into the bowl.

Manual juice extractors have been largely replaced by electric juicers. Various electric juicers exist, including centrifugal juicers which include blades and spins to separate the juice from pulp, masticating which grinds and then squeezes the juice from the pulp, and simple citrus juicers which resemble a manual juicer but include an electric motor to rotate the juicing cone.

While the known juicers are often satisfactory, users still desire a simple automatic juicer which is not as rough on the fruit as the centrifugal or masticating juicers, but does not require the users to manually push the fruit on the electrically turned juicing cone.

BRIEF SUMMARY OF THE INVENTION

The present invention addresses the above and other needs by providing an automatic juicer which turns and pushes an upward facing juicing cone into a fruit for releasing and collecting juice. The juicer includes a base containing a clutch and gearing assembly connected to a motor. A center column assembly rotates and vertically advances the juicing cone into the fruit. The juicing cone, strainer, and a bowl release and catch the juice. The center column includes an outer column fixed to the base, a rotating drive shaft driven by the motor but not advancing vertically, and a driven shaft which rotates with the drive shaft and advances and retreats vertically. The bowl is fixed to the base. The strainer advances vertically with juicing cone but does not rotate. The juicing cone is attached to the driven shaft and rotates and advances vertically, thereby releasing juice from the fruit. Knife edges on the bottom of the juicing cone scrape pulp from the strainer to prevent clogging.

In accordance with one aspect of the invention, there is provided an automatic juicer. The juicer includes a base, a center column assembly, a juicing cone, a strainer, and a bowl. The base contains a motor and a clutch and gearing assembly connected to the motor. The center column assembly is fixed to the base and includes a vertical outer cylinder (or column) fixed to the base, a drive shaft residing inside the outer cylinder and turned by the motor through the clutch and gearing assembly, a driven shaft, and a nut residing inside the outer cylinder and constrained to not rotate while threadedly cooperating with the rotating drive shaft to advance and retreat vertically. The drive shaft rotates but does not advance or retreat vertically. The driven shaft rotates with the drive shaft and advances and retreats vertically. The nut threadedly cooperates with the drive shaft to advance and retreat vertically when the drive shaft rotates and is vertically coupled to the driven shaft to advance the driven shaft vertically. The bowl is fixed to the base. The juicing cone is attached to the driven shaft and rotates and advances vertically with the driven shaft, thereby releasing juice from the fruit.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
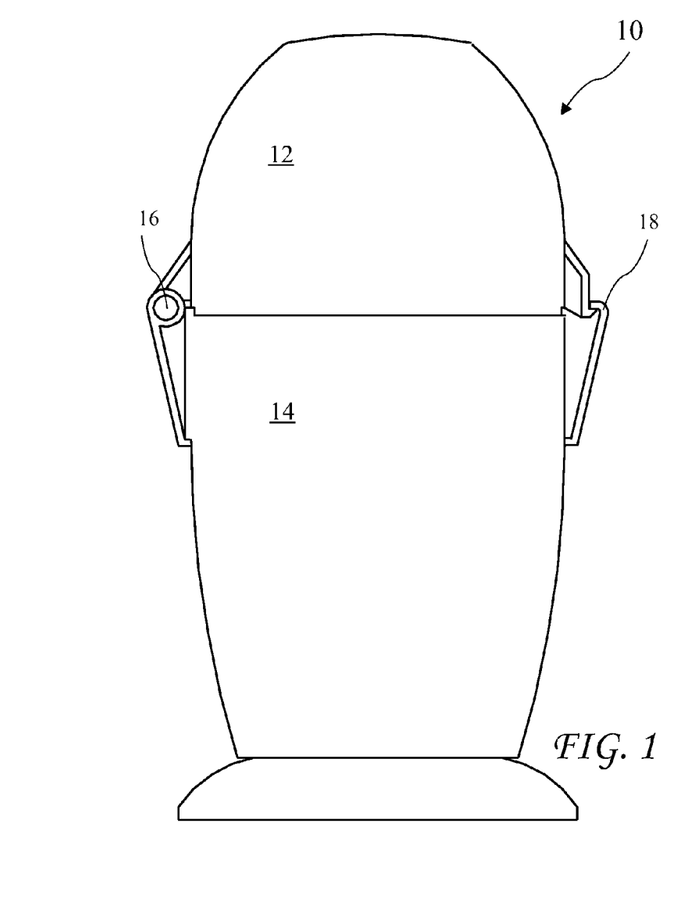
FIG. 1 is a juicer according to the present invention.
Figure 2:
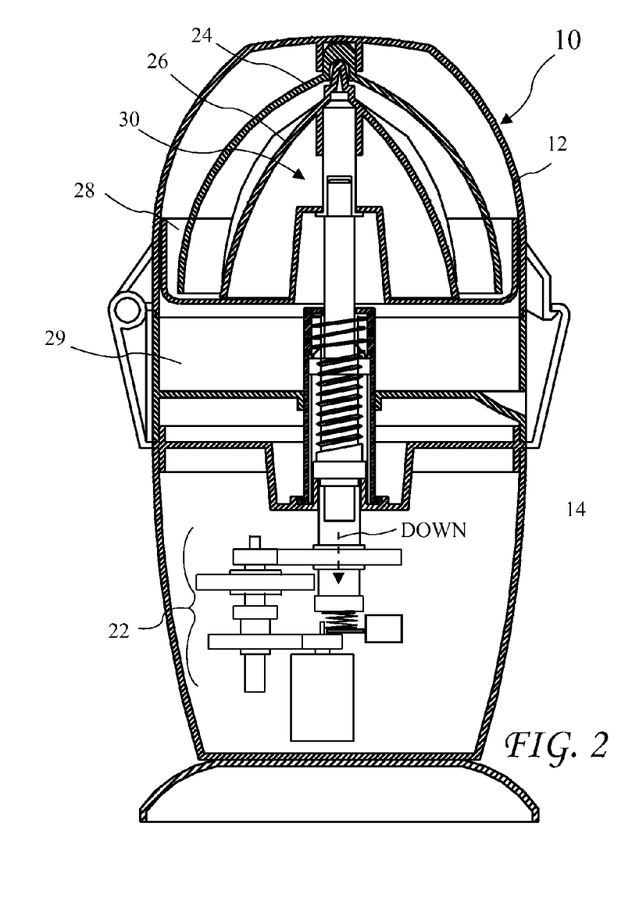
FIG. 2 is a cross-sectional view of the juicer according to the present invention with a juicing cone in an up position and the lid closed.
Figure 3:
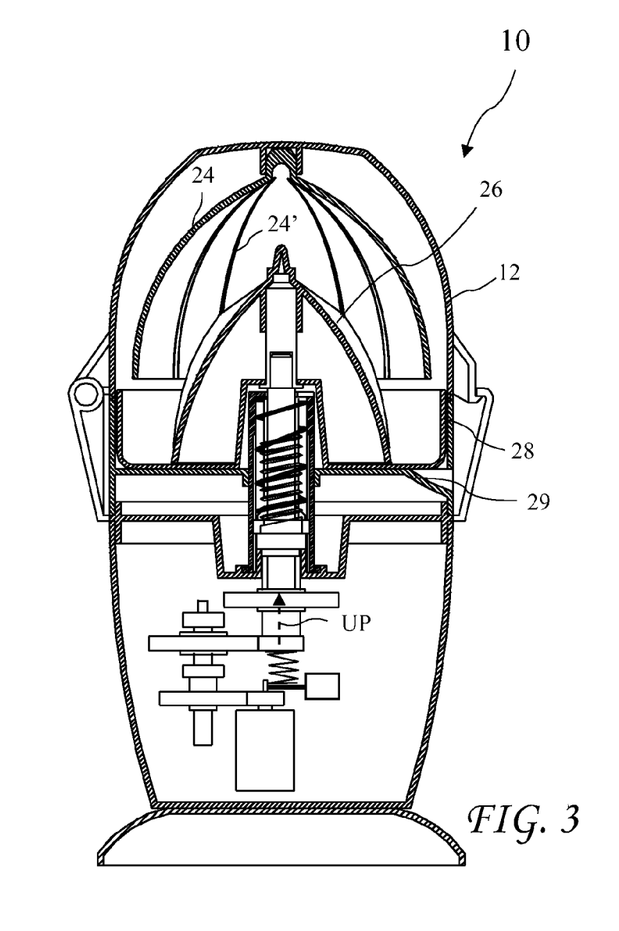
FIG. 3 is a cross-sectional view of the juicer according to the present invention with the juicing cone in a down position and the lid closed.
Figure 4:
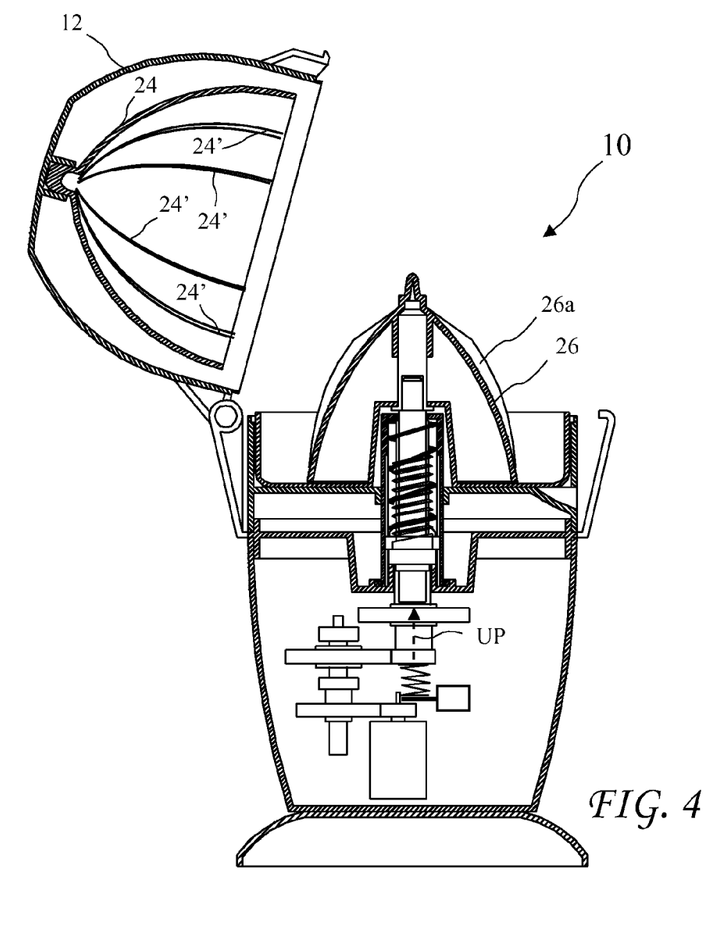
FIG. 4 is a cross-sectional view of the juicer according to the present invention with the juicing cone in a down position and the lid open.

A juicer 10 according to the present invention is shown in FIG. 1, a cross-sectional view of the juicer 10 with a juicing cone in an up position and a lid 12 closed is shown in FIG. 2, a cross-sectional view of the juicer 10 with a juicing cone in a down position and the lid 12 closed is shown in FIG. 3, and a cross-sectional view of the juicer 10 with a juicing cone in a down position and the lid 12 open is shown in FIG. 4. A hinge 16 connects the lid 12 to the base 14, and a latch 18 holds the lids closed during operation of the juicer 10. The fruit holder 24 includes anti-slip elements on the inside fruit surface to prevent the fruit from rotating inside the fruit holder 24 during operation of the juicer. The anti-slip elements may be spikes, ridges or the like, for example ridges 24'.

Figures 15, 16, 17A, 17B:
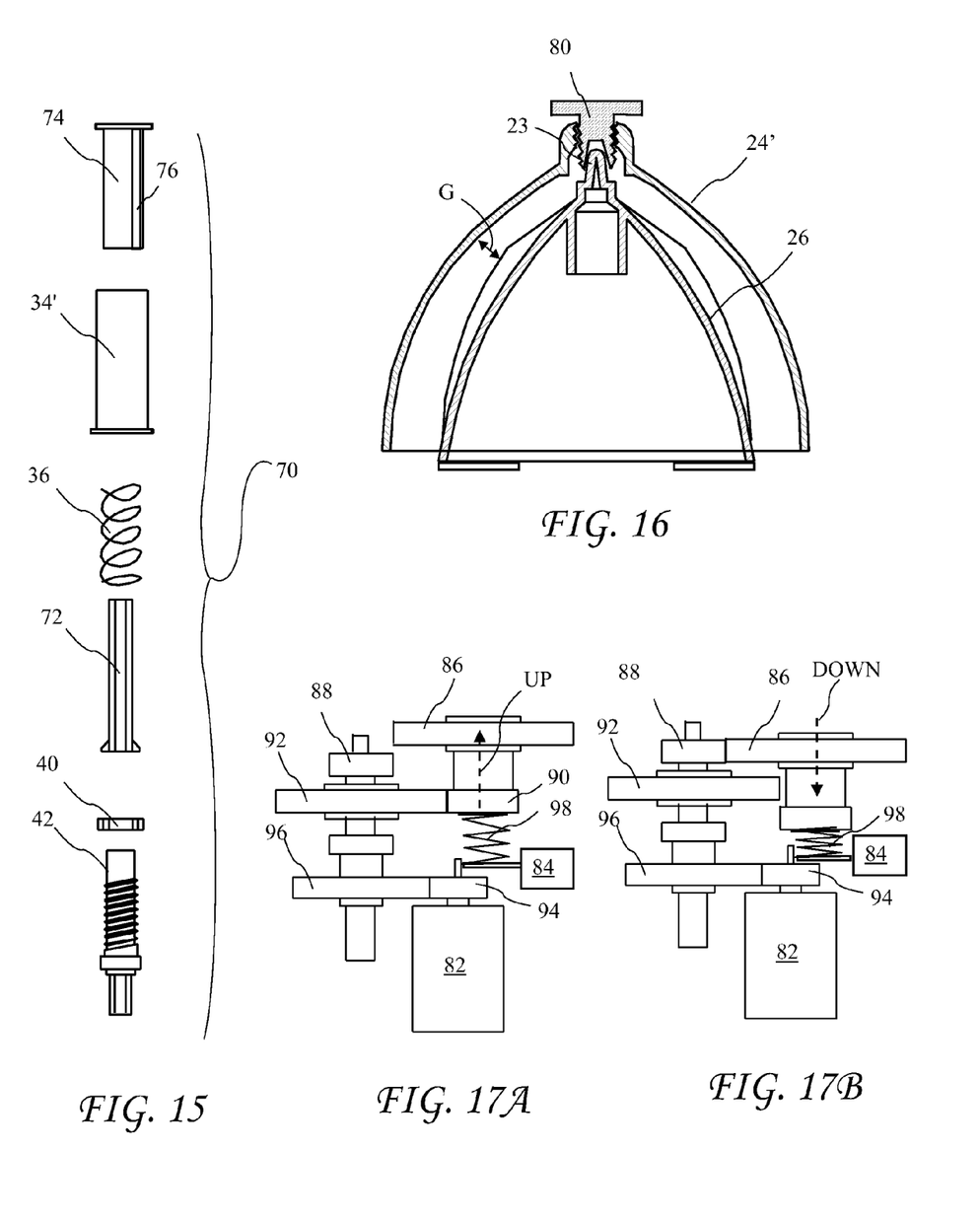
FIG. 15 is a second embodiment of a center column assembly according to the present invention of the juicer.
FIG. 16 shows a second fruit holder with an adjustable seat.'
FIG. 17A shows a clutch and gearing assembly according to the present invention in a high speed position.
FIG. 17B shows the clutch and gearing assembly according to the present invention in a high torque position.

The juicer 10 includes a base 14 housing a motor 20 and a gearing assembly 22 (see FIGS. 17A and 17B for details). The motor 20 may be manually controlled by a user to operate in a first direction to raise the juicing cone against fruit for about 5 seconds and then manually controlled to lower the juicing cone, or may be automated to raise the juicing cone against fruit for about 5 seconds and then automatically reverse. The motor 20 and the gearing assembly 22 may alternatively be controlled by measuring the vertical force of the juicing cone against the fruit, and the motor direction reversed when the force reaches a predetermined level. (Can we add anything here? Is there an off the shelf unit you can use?)

The juicer 10 includes a fruit holder 24, the juicing cone 26, a strainer 28, and a bowl 29. The fruit holder 24 is fixed inside the lid 12 and opens with the lid 12. The juicing cone 26 includes ridges 25 (see FIG. 5C) and rises into the fruit and rotates. The ridges 25 cut into the pulp of the fruit to release fruit juice and the rising juicing cone 26 compresses the pulp to further release the juice. The strainer 28 resides under the juicing 26 cone and rises with the juicing cone 26 but does not rotate. The bowl 29 is fixed to the base 14 and does not rise or rotate, and catches the juice released from the fruit.

Figure 5A:
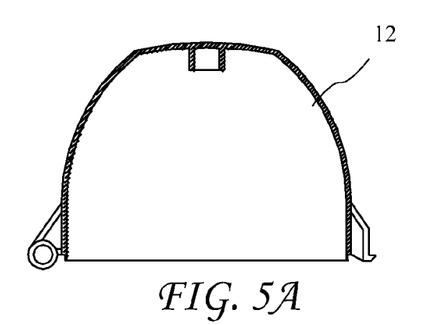
FIG. 5A is a cross-sectional view of the lid of the juicer.
Figure 5B:
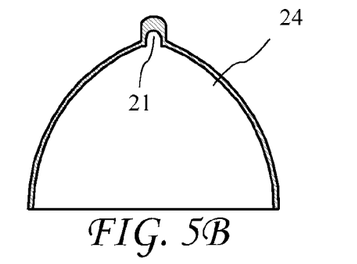
FIG. 5B is a cross-sectional view of a fruit holder, according to the present invention, of the juicer.
Figure 5C:
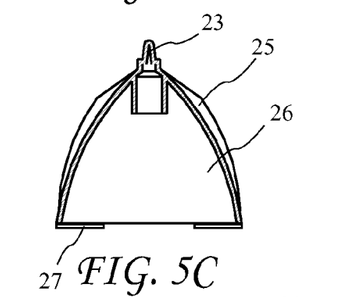
FIG. 5C is a cross-sectional view of the juicing cone, according to the present invention, of the juicer.
Figure 5D:
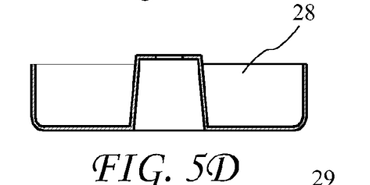
FIG. 5D is a cross-sectional view of a strainer, according to the present invention, of the juicer.
Figure 5E:
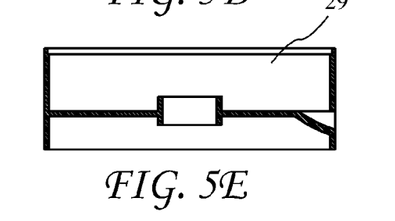
FIG. 5E is a cross-sectional view of a bowl, according to the present invention, of the juicer.

A cross-sectional view of the lid 12 of the juicer 10 is shown in FIG. 5A, a cross-sectional view of the fruit holder 24, according to the present invention, of the juicer 10 is shown in FIG. 5B, a cross-sectional view of the juicing cone 26, according to the present invention, of the juicer 10 is shown in FIG. 5C, a cross-sectional view of a strainer 28, according to the present invention, of the juicer 10 is shown in FIG. 5D, and a cross-sectional view of a bowl 29, according to the present invention, of the juicer 10 is shown in FIG. 5E. The upward facing face of the juicing cone 26 includes ridges 25 for cutting into the pulp of the fruit and a lower end of the juicing cone 26 includes blades (or scrapers) 27 which scrape against a top surface of the strainer 28 to prevent pulp from blocking the strainer 28 during use. The fruit holder 24 includes a seat 21 for limiting upward movement of the juicing cone 26, and the juicing cone 26 includes a stop 23 for cooperation with the seat 21.

Figure 6:
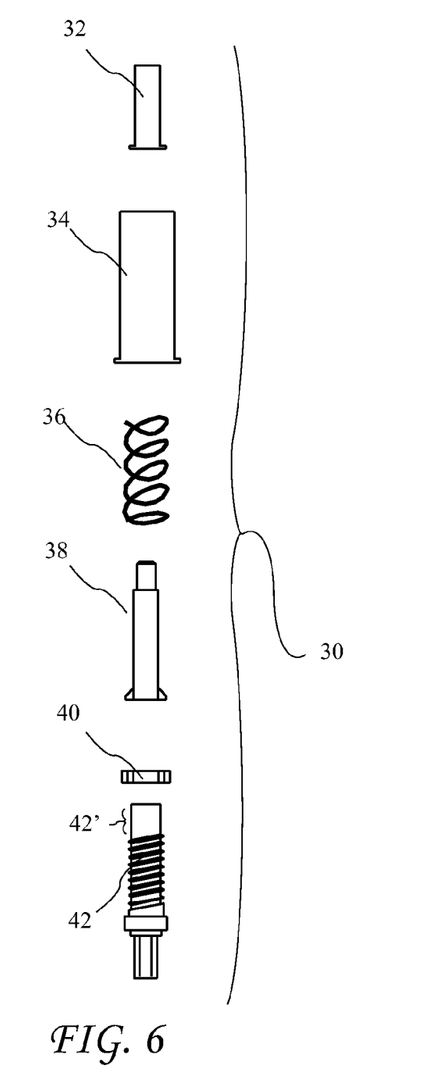
FIG. 6 is an exploded view of a center column assembly, according to the present invention, of the juicer.
Figure 7:
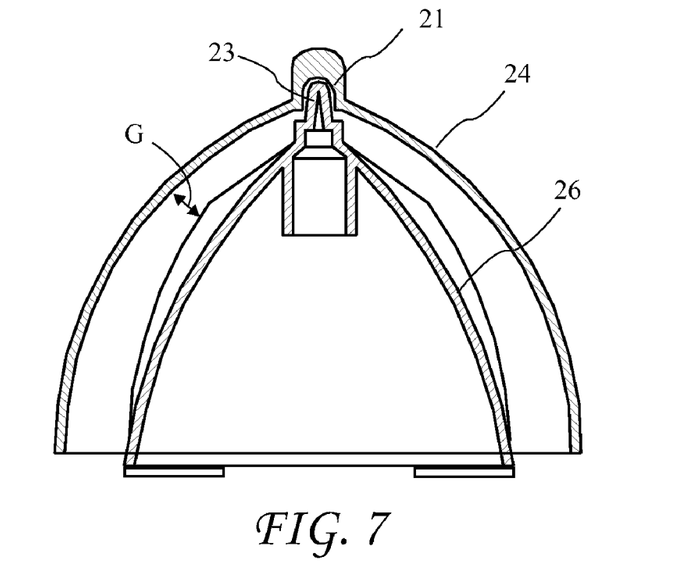
FIG. 7 shows a vertical stop according to the present invention.

An exploded view of a center column assembly 30 according to the present invention of the juicer 10 is shown in FIG. 6. The center column assembly 30 includes a rotating and vertically translating lift tube 32, a stationary (non-rotating and non-translating) outer tube 34 attached to the base 14 (see FIG. 1), a spring 36, a driven shaft 38, a nut 40, and a drive shaft 42. The lift tube 32 lifts and rotates the juicing cone 26. The spring 36 resides inside the outer tube 34 and provides downward force on the driven shaft 38 and/or the nut 40 to bias the center column assembly 30 towards a down position (see FIGS. 2-4). The driven shaft 38 resides inside the drive shaft 42 and is keyed to rotate with the drive shaft 42 but free to vertically translate. The nut 40 is threaded into the exterior of the drive shaft 42 and includes at least one outside notch 44 (see FIG. 11B) to engage a vertical rail 39 (see FIG. 9D) in the outer tube 34 to prevent the nut 40 from rotating with the drive shaft 42. A smooth portion 42' at the top of the drive shaft 42 allowing the drive shaft 42 to rotate freely from the nut 40 at maximum extension.

Figure 8:
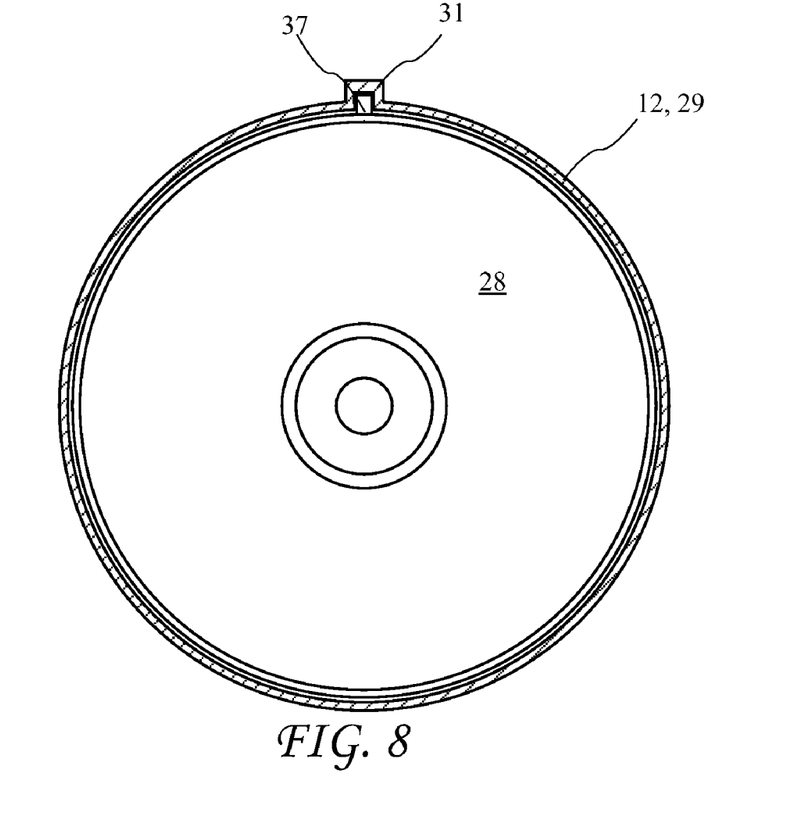
FIG. 8 shows a strainer key and key way.

A vertical stop according to the present invention is shown in FIG. 8. The juicing cone 26 includes a stop 23 at the peak of the cone, and the fruit holder 24 includes a seat 21 above the stop 23. The seat 21 limits the vertical movement of the juicing cone 26 to establish a minimum gap G between the ridges 25 and the interior of the fruit holder 24 to prevent or reduce the ridges 25 cutting into the fruit rind.

A strainer key 37 and key way 31 are shown in FIG. 8. The key 37 resides on an edge of the strainer and engages the key way 31 in the lid 12 and/or bowl 29 to prevent rotation of the strainer 28 so that the blades 27 on the bottom of the juicing cone 26 can scrape pulp from the inside of the strainer 28, which pulp might otherwise block the strainer 28.

Figure 9A:
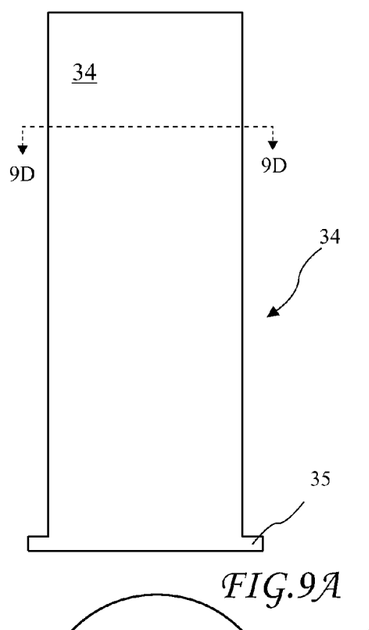
FIG. 9A is a side view of an outer tube (or column), according to the present invention, of the center column of the juicer.
Figure 9B:
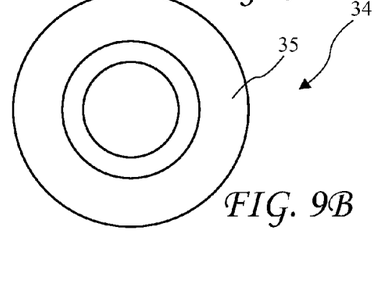
FIG. 9B is a bottom view of an outer tube, according to the present invention, of the center column of the juicer.
Figure 9C:
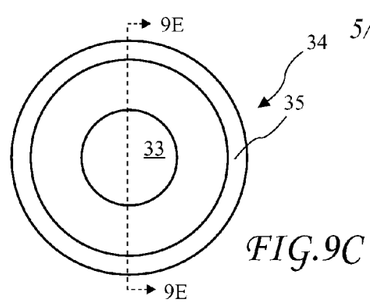
FIG. 9C is a side view of an outer tube, according to the present invention, of the center column assembly of the juicer.
Figure 9D:
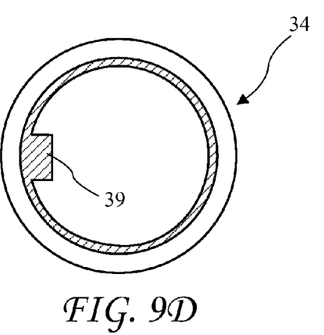
FIG. 9D is a cross-sectional view of the outer tube taken along line 9D-9D of FIG. 9A.
Figure 9E:
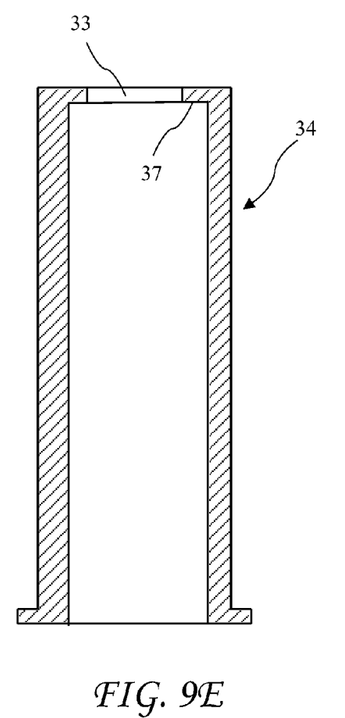
FIG. 9E is a cross-sectional view of the outer tube taken along line 9E-9E of FIG. 9C.

A side view of the outer tube (or column) 34 of the center column assembly 30 of the juicer 10 is shown in FIG. 9A, a bottom view of the outer tube 34 is shown in FIG. 9B, a side view of the outer tube 34 is shown in FIG. 9C, a cross-sectional view of the outer tube 42 taken along line 9D-9D of FIG. 9A is shown in FIG. 9D, and a cross-sectional view of the outer tube 34 taken along line 9E-9E of FIG. 9C is shown in FIG. 9E. The outer tube 34 has a cylindrical exterior and cylindrical interior with an outer tube flange 35 at the base for attaching to the juicer base 14. The outer tube 34 is fixed and neither rotates nor translates. An interior vertical rail 39 runs the length of the interior and cooperates with one of the notches 44 (see FIG. 11B) of the nut 40 to prevent rotation of the nut. The outer tube 34 includes a ceiling 37 for cooperation with the spring 36. While a preferred outer tube 34 has a cylindrical interior and exterior, a juicer according to the present invention with an outer column which is not cylindrical is intended to come within the scope of the present invention.

Figure 10A:
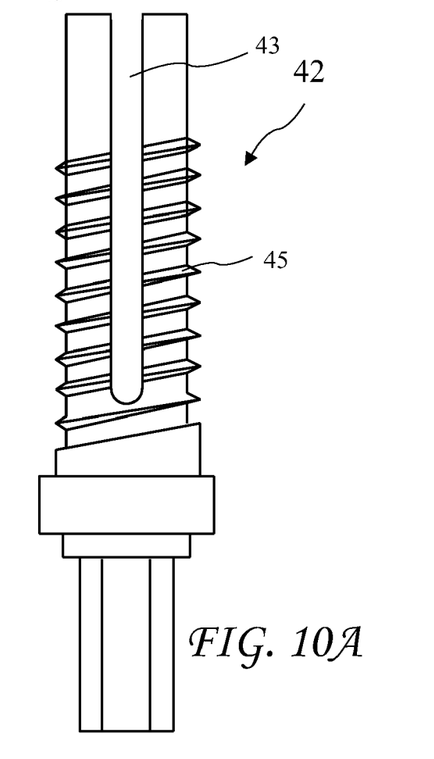
FIG. 10A is a side view of a drive shaft, according to the present invention, of the center column of the juicer.
Figure 10B:
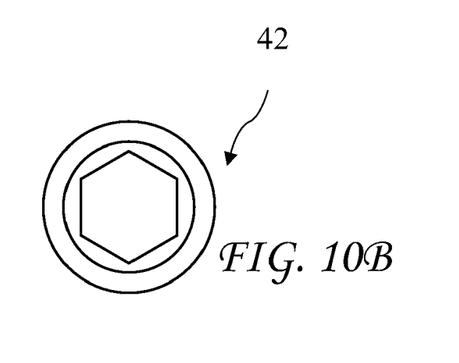
FIG. 10B is a bottom view of the drive shaft of the center column assembly of the juicer.
Figure 10C:
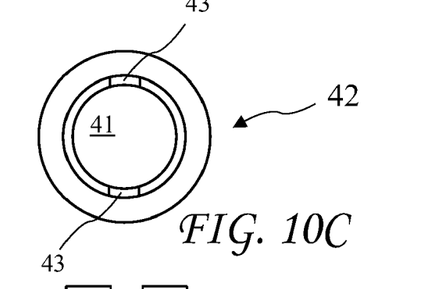
FIG. 10C is a top view of the drive shaft of the center column assembly of the juicer.

A side view of a drive shaft 42, according to the present invention, of the center column assembly 30 of the juicer 10 is shown in FIG. 10A, a bottom view of the drive shaft 42 is shown in FIG. 10B, and a top view of the drive shaft 42 is shown in FIG. 10C. The drive shaft 42 is connected to the motor 20 through the gearing assembly 22 (see FIG. 2) and is rotated by the gearing assembly 22 but does not translate. The drive shaft 42 includes threads 45 on a cylindrical exterior for cooperation with a threaded interior 47 (see FIG. 11B) of the nut 40. Because the outer tube 34 prevents rotation of the nut 40, rotation of the drive shaft 42 causes the nut 40 to translate vertically. The drive shaft 42 further includes a lengthwise inner passage 41 and key ways 43 running vertically lengthwise into the inner passage 41. The inner passage 41 is preferably cylindrical to reduce manufacturing costs, but may have other cross-sections.

Figure 11A:
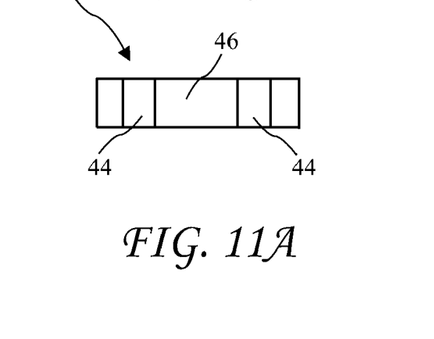
FIG. 11A is a side view of a nut, according to the present invention, of the center column assembly of the juicer.
Figure 11B:
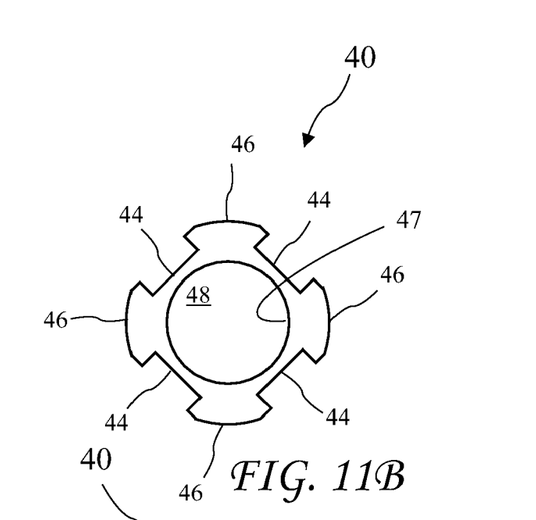
FIG. 11B is a top view of the nut of the center column assembly of the juicer.

A side view of the nut 40, according to the present invention, of the center column assembly 30 of the juicer 10 is shown in FIG. 11A, and a top view of the nut 40 is shown in FIG. 11B. The nut 40 includes a threaded interior 47 for cooperation with threads 45 on the drive shaft 42 (see FIG. 10A) and external notches 44 and external lands 46 on the exterior of the nut. The lands 46 center the nut 40 in the inner passage 41 of the drive shaft 42 and the notches 44 prevent the nut 40 from rotating inside the outer column 34. Only one notch 44 is required and in another embodiment, the nut may include a projecting key for cooperation with a key way inside the outer column 34.

Figure 12A:
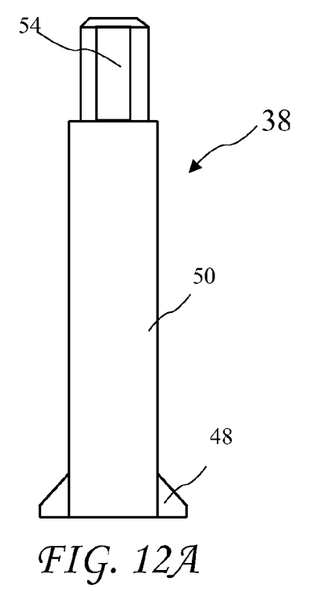
FIG. 12A is a side view of a driven shaft, according to the present invention, of the center column assembly of the juicer.
Figure 12B:
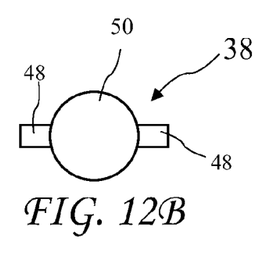
FIG. 12B is a bottom view of the driven shaft of the center column assembly of the juicer.
Figure 12C:
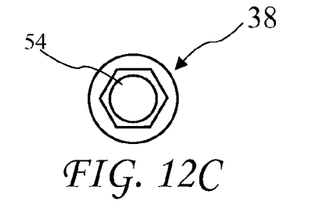
FIG. 12C is a top view of the driven shaft of the center column assembly of the juicer.

A side view of the driven shaft 38, according to the present invention, of the center column assembly 30 of the juicer 10 is shown in FIG. 12A, a bottom view of the driven shaft 38 is shown in FIG. 12B, and a top view of the driven shaft 38 is shown in FIG. 12C. The driven shaft includes two keys 48 for cooperation with the key ways 43 in the drive shaft 42, causing the driven shaft 38 to rotate with the drive shaft 42 but allowing the driven shaft 38 to translate vertically with respect to the drive shaft 42. The keys 48 of the driven shaft 38 rest on the nut 40 to vertically couple the driven shaft 38 to the drive shaft 42. The driven shaft 38 further includes a cylindrical body 50 and a hexagonal nose 54 at an upper end for engaging the lift tube 32.

Figures 13A, 13B:
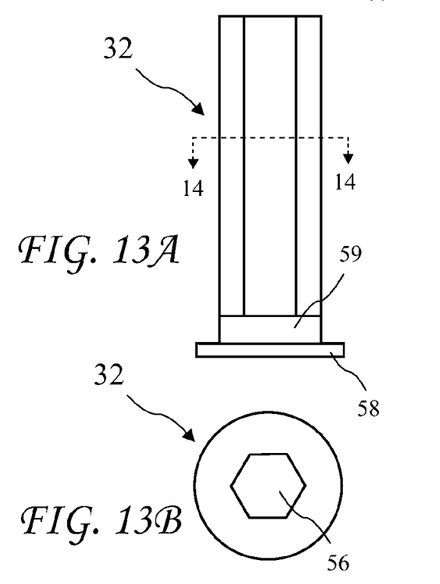
FIG. 13A is a side view of a lift tube, according to the present invention, of the center column assembly of the juicer.
FIG. 13B is a bottom view of the lift tube of the center column assembly of the juicer.
Figure 13C:
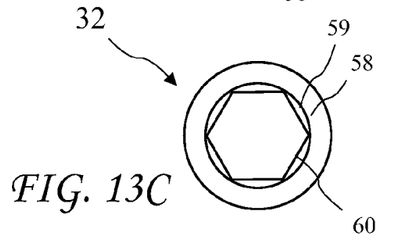
FIG. 13C is a top view of the lift tube of the center column assembly of the juicer.
Figure 14:
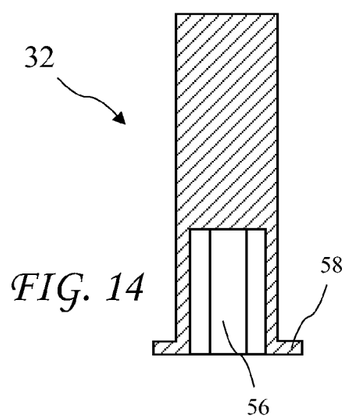
FIG. 14 is a cross-sectional view of the lift tube taken along line 14-14 of FIG. 13A.

A side view of a lift tube 32, according to the present invention, of the center column assembly 30 of the juicer 10 is shown in FIG. 13A, a bottom view of the lift tube 32 is shown in FIG. 13B, a top view of the lift tube 32 is shown in FIG. 13C, and a cross-sectional view of the lift tube 32 taken along line 14-14 of FIG. 13A is shown in FIG. 14. The lift tube 32 has a hexagonal exterior 6, a round base flange 58, and a hexagonal recess 56 in the base for cooperation with the nose 54 of the driven shaft 38 (see FIG. 12A). The lift tube is lifted and rotated by the driven shaft 38 and lifts and rotates the juicing cone 26 (see FIG. 5C).

A second embodiment of a center column assembly 70, according to the present invention, of the juicer 10, is shown in FIG. 15. The center column assembly 70 includes an inner tube 74, a second outer tube 34', and a hexagonal driven shaft 72. The second outer tube 34' is similar to the outer tube 34, but does not include the ceiling 37, allowing the inner tube 74 to be inserted into the top of the outer tube 34' and have an outer diameter sliding into the interior of the outer tube 34'. The exterior of the inner tube 74 includes a notch 76 running the length of the inner tube 74 to engage the vertical rail 39 of the outer tube 34' to allow the inner tube 74 to translate vertically within the outer tube 34', but to cause the inner tube 74 to rotate with the outer tube 34'. The hexagonal driven shaft 72 engages the juicing cone 26 to lift and rotate the juicing cone 26 (see FIG. 5C). The center column assembly 70 is otherwise similar to the center column assembly 30.

A second fruit holder 24' with an adjustable seat 80 is shown in FIG. 16. The adjustable seat 80 preferably includes threads which cooperate with the fruit holder 24' to allow adjustment of the gap G between the juicing cone 26 and the fruit holder 24'.

The gearing assembly 22 (see FIG. 2) according to the present invention is shown in a high speed position in FIG. 17A and in a high torque position in FIG. 17B. The gearing assembly 22 includes a motor 82, switch 84, first gears 94 and 96, second gears 90 and 92, third gears 86 and 88, and a spring 98. The gears 94 and 96 are always engaged. In the relaxed (or UP) position, the spring 98 pushed the gears 90 and 86 upwards, and the gear 90 engages the gear 92 to provide high speed. In the compressed (or DOWN) position, the spring 98 is compressed allowing the gears 90 and 86 to move downward, and the gear 86 engages the gear 88 to provide high torque. The spring 98 further provides a relief from exerting too great a downward force on the gearing assembly 22 or too much upward force on the juicing cone 26. The springs 98 and 36 (see FIG. 6) combine to limit the force exerted on the fruit to preferably between one pound and 50 pounds, and more preferably limit the force exerted on the fruit to between ten pounds and 25 and most preferably limit the force exerted on the fruit to approximately 18 pounds.

While the invention herein disclosed has been described by means of specific embodiments and applications thereof, numerous modifications and variations could be made thereto by those skilled in the art without departing from the scope of the invention set forth in the claims.

I claim:

1. An automatic juicer comprising:
   a lid openable to allow fruit to be placed in the juicer;
   a base containing a motor;
   a center column assembly attached to the base and comprising:
   an outer column fixed to the base;
   a hollow vertical drive shaft residing in the outer column, turned by the motor, and vertically fixed and including a threaded cylindrical exterior and at least one vertical keyway reaching radially through the hollow vertical drive shaft; and
   a driven shaft which rotates with the drive shaft and advances vertically with respect to the drive shaft and including at least one protruding key for cooperation with the vertical keyway in the drive shaft to cause the driven shaft to rotate with the driveshaft;
   a nut resides inside the outer column and on the threaded cylindrical exterior of the drive shaft, the nut including internal threads for cooperation with the threaded cylindrical exterior of the drive shaft and the nut cooperating with the fixed outer column to prevent the nut from rotating causing the nut to advance and retreat vertically when the drive shaft rotates, the protruding key of the driven shaft resting on top of the nut, wherein the vertical advancing of the nut lifts the driven shaft;
   a bowl attached to the base; and
   a juicing cone attached to the driven shaft and rotates and advances vertically with the driven shaft, for rotating and pushing into a fruit for releasing juice from the fruit to be caught in the bowl.

2. The juicer of claim 1, further including a strainer between the bowl and the juicing cone.

3. The juicer of claim 2, wherein, the strainer advances vertically with the juicing cone.

4. The juicer of claim 3, wherein:
   the strainer does not rotate; and
   the juicing cone includes knife edges on a bottom surface for clearing pulp blocking the strainer.

5. The juicer of claim 3, wherein the strainer does not rotate.

6. The juicer of claim 5, wherein the strainer includes a key and at least one of the bowl and the lid includes a key way for cooperation with the key to prevent rotation of the strainer.

7. The juicer of claim 1, wherein:
   the nut includes at least one exterior notch;
   the outer column includes an interior vertical rail; and
   cooperation of the at least one exterior notch with the interior vertical rail prevents rotation of the nut with respect to the outer column.

8. The juicer of claim 7, wherein:
   the drive shaft includes at least two vertical slots;
   the driven shaft includes at least two keys; and the at least two keys slide vertically in the vertical slots and couples rotation of the drive shaft to the driven shaft.

9. The juicer of claim 1, wherein the base further includes a clutch and gearing assembly between the motor and the drive shaft to reduce a rotation rate and to limit the force exerted on fruit by the juicing cone.

10. The juicer of claim 9, wherein the motor runs in two directions to either vertically advance or vertically retreat the juicing cone.

11. The juicer of claim 9, wherein the direction of the motor is initially to advance the juicing cone into the fruit, and after a period of time the direction of the motor reverses to vertically retreat the juicing cone from the fruit.

12. The juicer of claim 9, wherein the direction of the motor is initially to advance the juicing cone into the fruit, and after a preset resistance to advancing the juicing cone into the fruit is experienced, the direction of the motor reverses to vertically retreat the juicing cone from the fruit.

13. The juicer of claim 9, wherein the vertical advancing of the juicing cone is limited to prevent the juicing cone from cutting into a rind of the fruit.

14. The juicer of claim 13, wherein the vertical advancing of the juicing cone is limited by cooperation of a stop on the juicing cone with a seat in the lid.

15. An automatic juicer comprising:
a base containing a motor;
a lid openable to allow fruit to be placed in the juicer;
a clutch and gearing assembly connected to the motor;
a center column assembly fixed to the base and comprising:
    a vertical outer cylinder fixed to the base, and having a rail on an inside surface of the outer cylinder extending vertically inside the outer cylinder;
    a drive shaft residing inside the outer cylinder and turned by the motor through the clutch and gearing assembly, the drive shaft not advancing or retreating vertically;
    a driven shaft rotating with the drive shaft and advancing and retreating vertically; and
    a nut residing inside the outer cylinder and constrained to not rotate by the cooperation of notches on an outer surface of the nut with rail inside the outer cylinder and threadedly coupled to the drive shaft to advance and retreat vertically when the drive shaft rotates and vertically coupled with the driven shaft to advance the driven shaft vertically; the driven shaft including at least one protruding key cooperating with a vertical keyway in the drive shaft, the protruding key of the driven shaft resting on top of the nut;
a bowl fixed to the base;
an upward facing juicing cone for rotating and pushing into a fruit, the juicing cone attached to the driven shaft and rotates and advances vertically with the driven shaft, thereby releasing juice from the fruit.

16. An automatic juicer comprising:
a base;
a motor residing in the base;
a clutch and gearing assembly residing in the base and connected to the motor, the clutch and gearing assembly providing a reduced rotation rate;
a lid pivotally attached to the base to allow fruit to be placed in the juicer;
a center column assembly fixed to the base and comprising:
    a vertical outer column fixed to the base;
    a drive shaft residing inside the outer column and turned at the reduced rotation rate by the motor through the clutch and gearing assembly, the drive shaft not advancing or retreating vertically;
    a driven shaft rotating with the drive shaft and advancing and retreating vertically;
    a nut residing inside the outer column and constrained to not rotate by cooperation of the nut with the outer column and threadedly coupled to the drive shaft to advance and retreat vertically when the drive shaft rotates and vertically coupled with the driven shaft to advance the driven shaft vertically; the driven shaft including at least one protruding key cooperating with a vertical keyway in the drive shaft, the protruding key of the driven shaft resting on top of the nut;
a spring for applying downward force to the driven shaft;
a fruit holder fixed inside the lid;
an upward facing juicing cone for rotating and pushing into a fruit, the juicing cone attaches to the driven shaft and rotates and advances vertically with the driven shaft, thereby releasing juice from the fruit, the advancing vertically of the juicing cone limited to at least one of prevent and reduce the juicing cone cutting into rind of the fruit and force exerted by the juicing cone against the fruit limited by the clutch and gearing assembly;
a bowl fixed to the base to catch juice released by the juicing cone; and
a non-rotating strainer between the bowl and the juicing cone for straining the juice released by the juicing cone, the strainer advancing vertically with the juicing cone and the juicing cone having blades residing proximal to an upper surface of the strainer to scrape pulp from the upper surface of the strainer to at least one of prevent and reduce blockage of the strainer.

\* \* \* \* \*